(12) United States Patent
Zhang et al.

(10) Patent No.: US 11,050,116 B2
(45) Date of Patent: Jun. 29, 2021

(54) SECONDARY BATTERY

(71) Applicant: CONTEMPORARY AMPEREX TECHNOLOGY CO., LIMITED, Ningde (CN)

(72) Inventors: Zige Zhang, Ningde (CN); Qingrui Xue, Ningde (CN); Jing Li, Ningde (CN); Pengxiang Wang, Ningde (CN); Wei Li, Ningde (CN)

(73) Assignee: CONTEMPORARY AMPEREX TECHNOLOGY CO., LTD., Ningde (CN)

(*) Notice: Subject to any disclaimer, the term of this patent is extended or adjusted under 35 U.S.C. 154(b) by 277 days.

(21) Appl. No.: 16/267,073

(22) Filed: Feb. 4, 2019

(65) Prior Publication Data
US 2020/0091485 A1 Mar. 19, 2020

(30) Foreign Application Priority Data
Sep. 18, 2018 (CN) .......................... 201811088576.2

(51) Int. Cl.
| H01M 50/40 | (2021.01) |
| H01M 10/05 | (2010.01) |
| H01M 10/42 | (2006.01) |
| H01M 50/172 | (2021.01) |

(52) U.S. Cl.
CPC ........... *H01M 50/40* (2021.01); *H01M 10/05* (2013.01); *H01M 10/4235* (2013.01); *H01M 50/172* (2021.01)

(58) Field of Classification Search
None
See application file for complete search history.

(56) References Cited

U.S. PATENT DOCUMENTS

| 2015/0147598 A1* | 5/2015 | Inoue | H01M 10/4235 429/7 |
| 2016/0036009 A1* | 2/2016 | Cho | H01M 2/021 429/179 |
| 2020/0203677 A1* | 6/2020 | Lee | H01M 2/027 |

FOREIGN PATENT DOCUMENTS

CN 207542313 U 6/2018

* cited by examiner

*Primary Examiner* — Wyatt P McConnell
(74) *Attorney, Agent, or Firm* — Morgan, Lewis & Bockius LLP

(57) ABSTRACT

The present disclosure provides a secondary battery, which comprises an electrode assembly, a case and a cap assembly. The electrode assembly comprises a first electrode member, a second electrode member and a separator. The case has an opening and receives the electrode assembly. The cap assembly comprises a cap plate and a first electrode terminal, the cap plate covers the opening of the case; the cap plate has an electrolyte injection hole. The first electrode member comprises a main portion, a first protruding portion and a second protruding portion, the first protruding portion is connected with an end of the main portion close to the cap plate, the second protruding portion connects the first protruding portion and the first electrode terminal. The first protruding portion extends to a lower side of the electrolyte injection hole, and a first end of the first protruding portion is beyond the second protruding portion.

18 Claims, 8 Drawing Sheets

SECONDARY BATTERY

CROSS-REFERENCE TO RELATED APPLICATIONS

The present application claims priority to Chinese patent application No. CN201811088576.2, filed on Sep. 18, 2018, which is incorporated herein by reference in its entirety.

FIELD OF THE PRESENT DISCLOSURE

The present disclosure relates to the field of battery, and particularly relates to a secondary battery.

BACKGROUND OF THE PRESENT DISCLOSURE

A secondary battery comprises an electrode assembly, a cap assembly and a case, the case receives the electrode assembly, a cap plate of the cap assembly is fixed with the case and seals the electrode assembly in the case. The electrode assembly comprises a first electrode member, a second electrode member and a separator separating the first electrode member and the second electrode member. When injecting an electrolyte, the electrolyte will impact the separator, if the pressure injecting the electrolyte is relatively large, the separator is prone to be folded, which will lead to an end of the first electrode member and an end of the second electrode member exposing, thereby causing risk of short circuit.

SUMMARY OF THE PRESENT DISCLOSURE

In view of the problem existing in the background, an object of the present disclosure is to provide a secondary battery, which can decrease folding probability of the separator when injecting an electrolyte, and reduce the risk of short circuit.

In order to achieve the above object, the present disclosure provides a secondary battery, which comprises an electrode assembly, a case and a cap assembly. The electrode assembly comprises a first electrode member, a second electrode member and a separator, the separator is provided between the first electrode member and the second electrode member. The case has an opening and receives the electrode assembly. The cap assembly comprises a cap plate and a first electrode terminal provided to the cap plate, the cap plate covers the opening of the case; the cap plate has an electrolyte injection hole. The first electrode member comprises a main portion, a first protruding portion and a second protruding portion, the first protruding portion is connected with an end of the main portion close to the cap plate, the second protruding portion electrically connects the first protruding portion and the first electrode terminal. In a width direction, the first protruding portion extends to a lower side of the electrolyte injection hole, and a first end of the first protruding portion close to the electrolyte injection hole is beyond the second protruding portion.

In the width direction, a second end of the first protruding portion away from the electrolyte injection hole is beyond the second protruding portion. A length of the first end beyond the second protruding portion is L1, a length of the second end beyond the second protruding portion is L2, L1 is greater than L2.

The first protruding portion extends from the end of the main portion along a direction approaching the cap plate, and a third end of the first protruding portion away from the main portion faces the cap plate and is connected with the second protruding portion.

The third end of the first protruding portion is not beyond the separator, and a stiffness of the first protruding portion is greater than a stiffness of the separator.

The second protruding portion comprises a first connecting region and a second connecting region, the first connecting region is electrically connected with the first electrode terminal and extends to the lower side of the electrolyte injection hole, the second connecting region bends relative to the first connecting region and connects the first protruding portion and the first connecting region.

The first electrode member comprises a current collector, an active material layer and a conductive structure, the current collector is a multi-layer structure and comprises an insulating substrate and a conducting layer provided on a surface of the insulating substrate. The conducting layer comprises a first portion and a second portion extending from the first portion, a surface of the first portion away from the insulating substrate is covered by the active material layer, and a surface of the second portion away from the insulating substrate is not covered by the active material layer. The conductive structure is welded with the second portion to form a first welding region, and the conductive structure extends in a direction away from the first portion. The main portion comprises the active material layer, the first portion and a region of the insulating substrate covered by the first portion; the first protruding portion comprises the second portion, a region of the insulating substrate covered by the second portion and a region of the conductive structure overlapped with the second portion; the second protruding portion comprises a region of the conductive structure beyond the second portion.

A surface of the first welding region has a plurality of recess portions. The number of the recess portions is 0.4-0.9 in per square millimeter with respect to distribution density, and a depth of the recess portion is 8 μm-16 μm.

A gap is provided between the first welding region and the first portion, and an insulating layer is provided in the gap.

The conducting layer further comprises a third portion, the third portion is connected with an end of the second portion away from the first portion, and a surface of the third portion away from the insulating substrate is not covered by the active material layer. In the width direction, a width of the third portion is smaller than a width of the second portion. The conductive structure is welded with the third portion to form a second welding region, the second welding region is connected with the first welding region.

The present disclosure has the following beneficial effects: in the secondary battery of the present disclosure, the electrolyte injection hole faces the first protruding portion; when injecting electrolyte, the electrolyte will impact the first protruding portion and the separator, the first protruding portion and the separator can bear the impact of the electrolyte at the same time, thereby decreasing folding probability of the separator, reducing the risk of short circuit; meanwhile, two adjacent first protruding portions can limit the separator between them, thereby increasing resistance to inwardly contracting of the separator, reducing contracting degree of the separator, avoiding the active material layer being exposed, and reducing the risk of short circuit.

Figure 1:
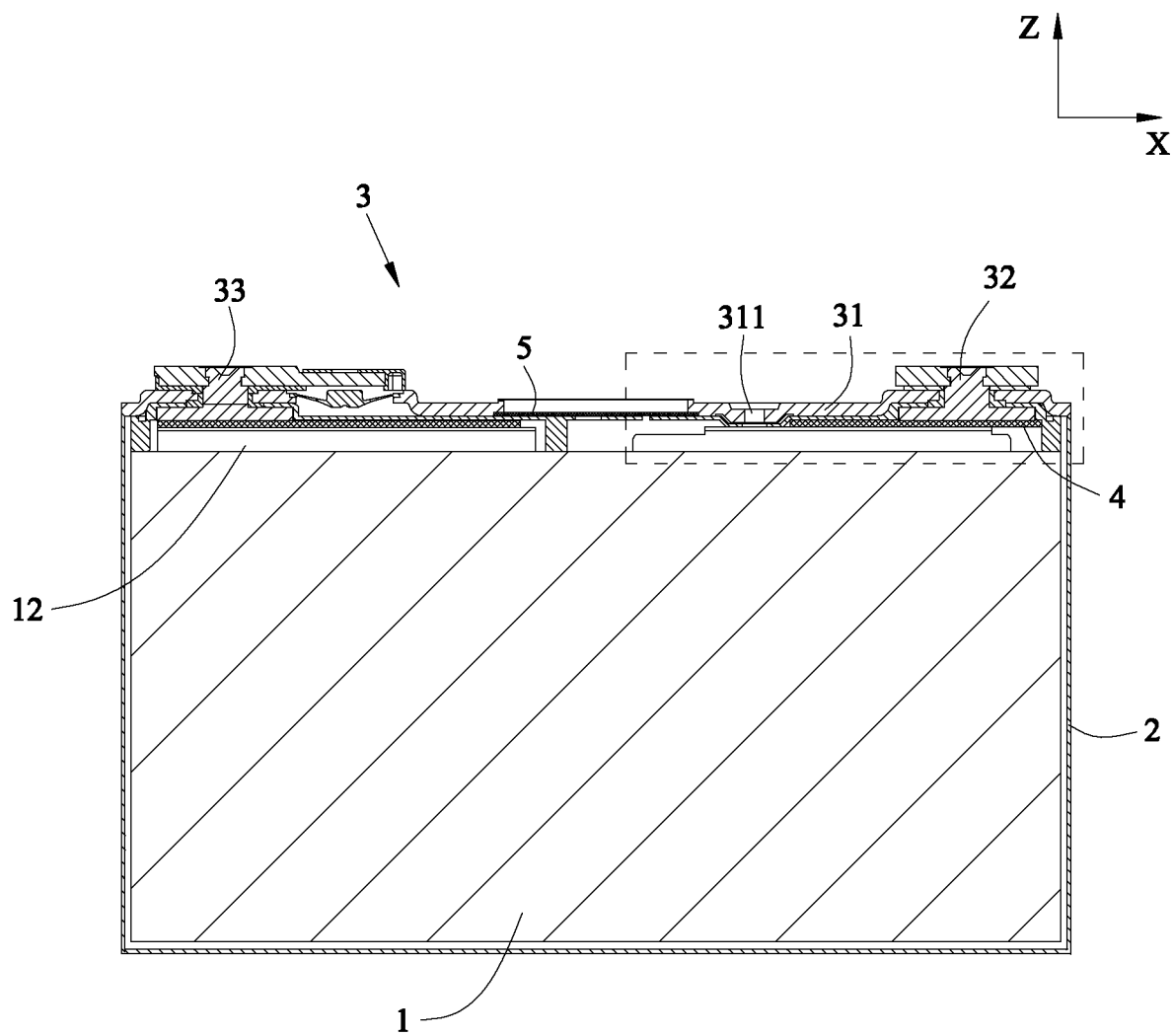
FIG. 1 is a schematic view of a secondary battery according to the present disclosure.

Reference numerals in figures are represented as follows:
1 electrode assembly
11 first electrode member
111 current collector
1111 insulating substrate
1112 conducting layer
11121 first portion
11122 second portion
11123 third portion
112 active material layer
113 conductive structure
114 insulating layer
12 second electrode member
13 separator
2 case
3 cap assembly
31 cap plate
311 electrolyte injection hole
32 first electrode terminal
33 second electrode terminal
4 connecting piece
5 vent
6 electrolyte
P1 main portion
P2 first protruding portion
P21 first end
P22 second end
P23 third end
P3 second protruding portion
P31 first connecting region
P32 second connecting region
C recess portion
W1 first welding region
W2 second welding region
X width direction
Y thickness direction
Z height direction

DETAILED DESCRIPTION

Hereinafter a secondary battery of the present disclosure will be described in detail in combination with the figures.

Figure 2:
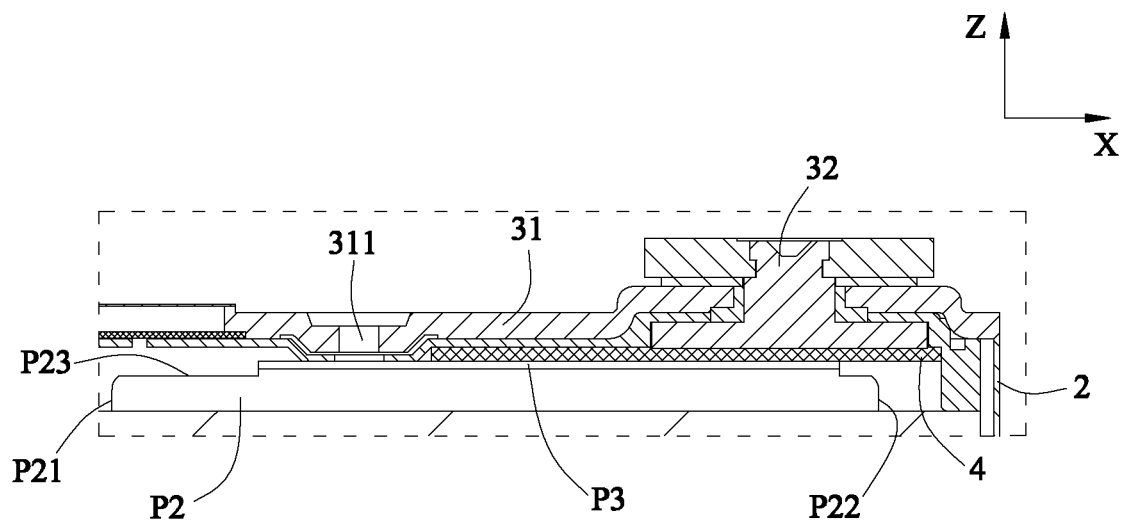
FIG. 2 is an enlarged view of a part of FIG. 1 within in a dotted line fame.
Figure 3:
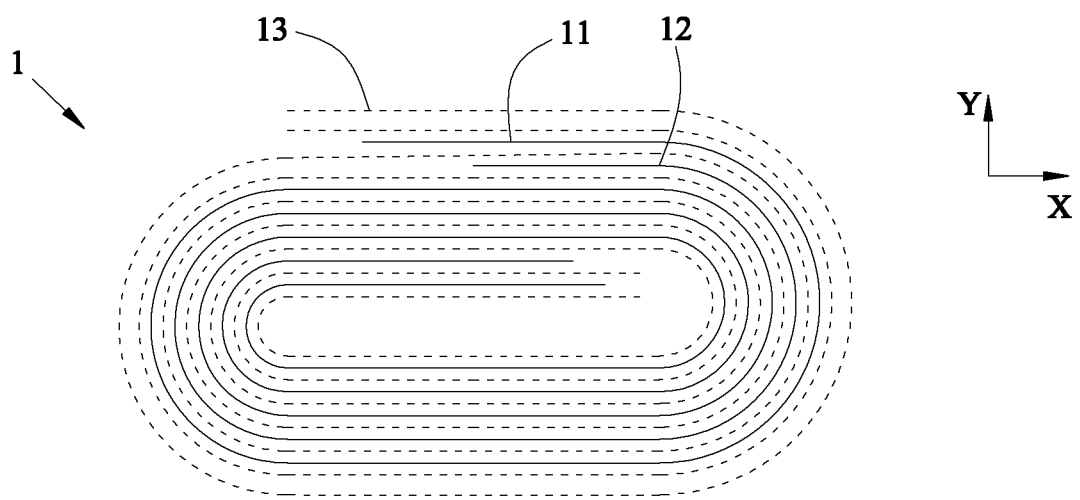
FIG. 3 is a cross sectional view of an electrode assembly according to the present disclosure.

Referring to FIG. 1 to FIG. 3, a secondary battery of the present disclosure comprises an electrode assembly 1, a case 2 and a cap assembly 3.

Referring to FIG. 3, the electrode assembly 1 comprises a first electrode member 11, a second electrode member 12 and a separator 13, the separator 13 is provided between the first electrode member 11 and the second electrode member 12. The electrode assembly 1 is formed by winding the first electrode member 11, the second electrode member 12 and the separator 13 around a winding axis, the winding axis may be parallel to a height direction Z. Two ends of the separator 13 along the winding axis are in a spiral after winding, each end forms a surface approximately.

The case 2 can have a hexahedron shape or other shape. A receiving cavity is formed inside the case 2 to receive the electrode assembly 1 and an electrolyte. An opening is formed in an end of the case 2, and the electrode assembly 1 can be placed into the receiving cavity of the case 2 via the opening. The case 2 can be made of a conductive metal, such as aluminum, aluminum alloy and the like, and also can be made of an insulating material, such as plastic and the like.

The cap assembly 3 comprises a cap plate 31, a first electrode terminal 32 and a second electrode terminal 33, the first electrode terminal 32 and the second electrode terminal 33 are provided to the cap plate 31. The cap plate 31 is fixed with the case 2 and covers the opening of the case 2, so as to seal the electrode assembly 1 in the case 2. The second electrode terminal 33 is electrically connected with the second electrode member 12. The cap assembly 3 further comprises a connecting piece 4, the connecting piece 4 connects the first electrode terminal 32 and the first electrode member 11.

The cap plate 31 is provided with an electrolyte injection hole 311. In the process of injecting the electrolyte of the battery, an electrolyte injection apparatus can inject the electrolyte into the case 2 via the electrolyte injection hole 311; after injecting the electrolyte, a sealing piece is welded above the electrolyte injection hole 311; the electrolyte injection hole 311 is disposed toward the corresponding end of the separator 13 along the winding axis.

Figure 4:
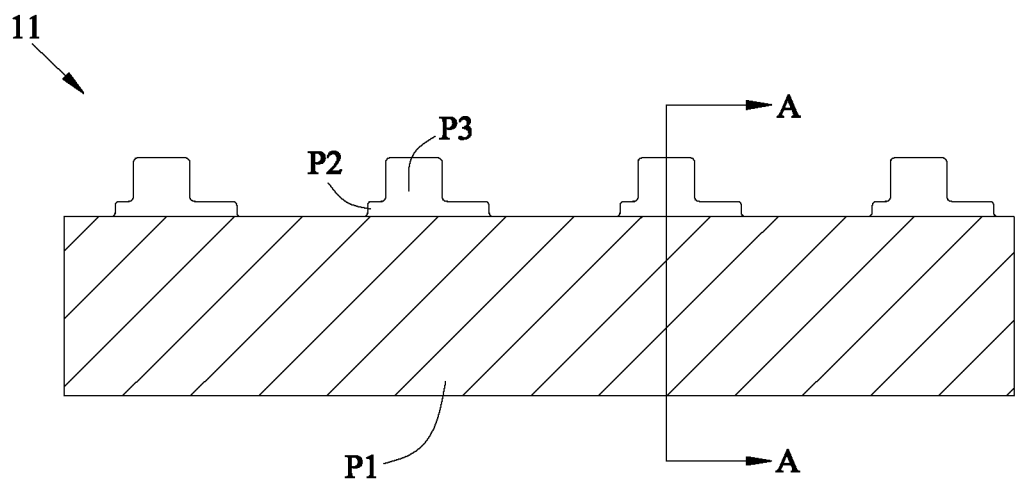
FIG. 4 is a schematic view of an embodiment of a first electrode member according to the present disclosure.
Figure 5:
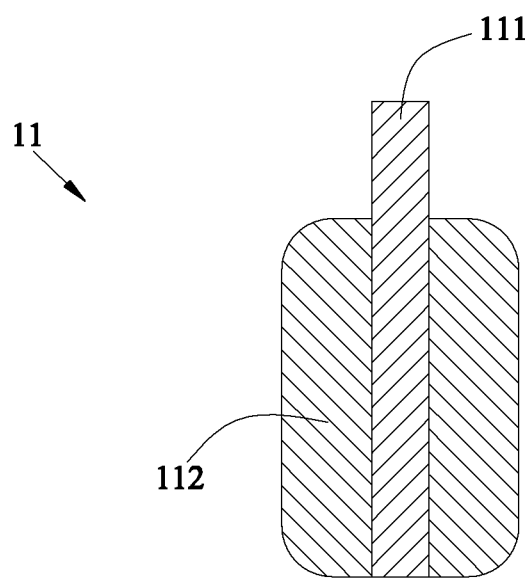
FIG. 5 is a cross sectional view taken along a line A-A of FIG. 4.

FIG. 4 is a schematic view of a first embodiment of the first electrode member 11 in a spread state, FIG. 5 is a cross sectional view taken along a line A-A of FIG. 4.

Referring to FIG. 4 and FIG. 5, the first electrode member 11 comprises a current collector 111 and an active material layer 112 provided to a surface of the current collector 111. A material of the current collector 111 and a material of the active material layer 112 can be determined depending on the polarity of the first electrode member 11. When the first electrode member 11 is a positive member, the current collector 111 can be an aluminum foil, the active material layer 112 can comprises a positive active material, such as lithium manganese oxide, lithium iron phosphate and the like; when the first electrode member 11 is a negative member, the current collector 111 can be a copper foil, the active material layer 112 can comprises a negative active material, such as graphite, silicon and the like.

The active material layer 112 and a part of the current collector 111 covered by the active material layer 112 form a main portion P1 of the first electrode member 11. The current collector 111 further has a protruding portion which is not covered by the active material layer 112, the protruding portion can be provided as multiple in number. Depending on difference in width of each protruding portion itself, each protruding portion can be divided into a first protruding portion P2 and a second protruding portion P3, a width of the first protruding portion P2 is greater than a width of the second protruding portion P3, and the first protruding portion P2 connects the main portion P1 and the second protruding portion P3.

Figure 6:
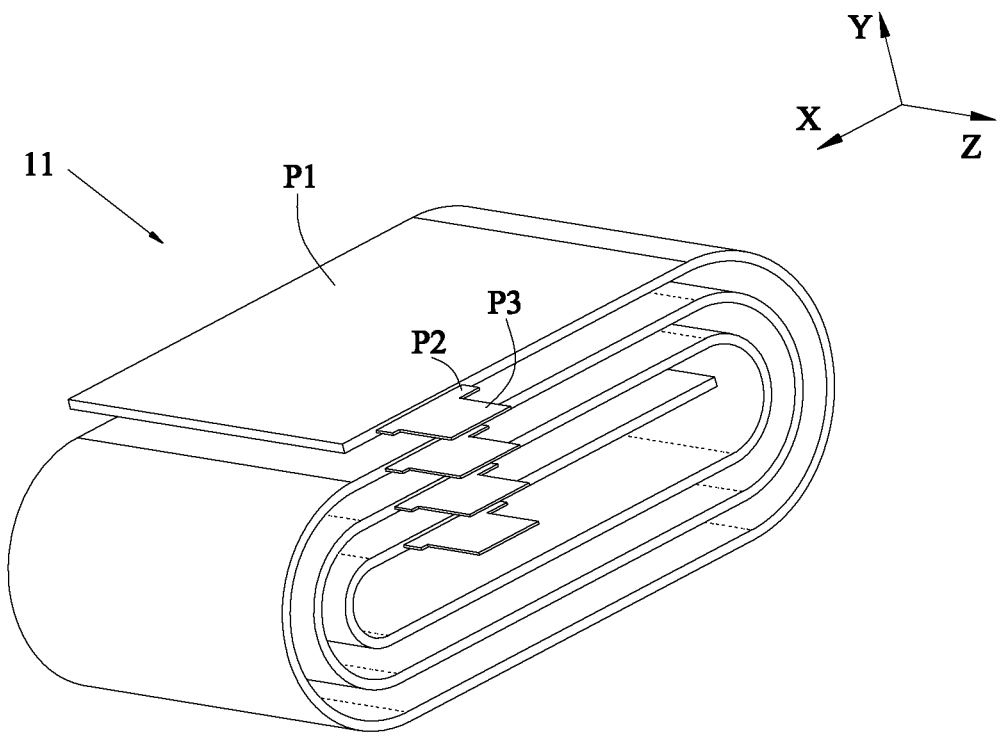
FIG. 6 is a schematic view of the first electrode member of FIG. 4 after winding.
Figure 7:
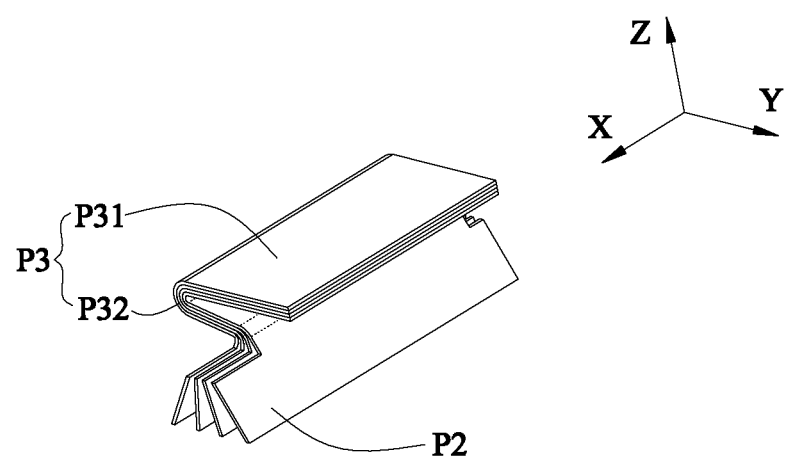
FIG. 7 is a schematic view of a first protruding portion and a second protruding portion according to the present disclosure.

Referring to FIG. 6, after winding, the protruding portions of the current collector 111 of the first electrode member 11 correspond to each other in a thickness direction Y. Referring to FIG. 7, the protruding portions of the current collector 111 are laminated together and electrically connected with the first electrode terminal 32.

Referring to FIG. 1 and FIG. 2, the first protruding portion P2 and the second protruding portion P3 are positioned on a side of the main portion P1 close to the cap plate 31, in other words, the first protruding portion P2 and the second protruding portion P3 are positioned on an upper side of the main portion P1 in the height direction Z. In the secondary battery, the second protruding portions P3 are laminated together and welded with the connecting piece 4. The first protruding portion P2 can be provided between the separator 13.

In a width direction X, the first protruding portion P2 extends to a lower side of the electrolyte injection hole 311; in the height direction Z, a projection of the electrolyte injection hole 311 overlaps a projection of the first protruding portion P2.

A first end P21 of the first protruding portion P2 close to the electrolyte injection hole 311 is beyond the second protruding portion P3. Referring to FIG. 1 and FIG. 2, the electrolyte injection hole 311 can be provided between the first electrode terminal 32 and the second electrode terminal 33; along a direction approaching the second electrode terminal 33, the first end P21 of the first protruding portion P2 is beyond the second protruding portion P3. Alternatively, the electrolyte injection hole 311 also can be provided on a side of the first electrode terminal 32 away from the second electrode terminal 33; along a direction away from the second electrode terminal 33, the first end P21 of the first protruding portion P2 is beyond the second protruding portion P3.

In the secondary battery, the end of the separator 13 close to the cap plate 31 needs to be beyond the main portion P1, thereby separating the first electrode member 11 and the second electrode member 12, avoiding the active material layer 112 contacting the second electrode member 12, and preventing short circuit. Because the separator 13 has a smaller stiffness, if the electrolyte directly impacts the separator 13 when injecting the electrolyte, the end of the separator 13 close to the cap plate 31 will fold and contract inwardly, which leads to an end of the active material layer 112 close to the cap plate 31 being exposed, the exposed active material layer 112 is prone to contact the second electrode member 12, thereby causing risk of short circuit.

In the secondary battery of the present disclosure, the electrolyte injection hole 311 faces the first protruding portion P21; when injecting electrolyte, the electrolyte will impact the first protruding portion P2 and the separator 13, the first protruding portion P2 and the separator 13 can bear the impact of the electrolyte at the same time, thereby decreasing folding probability of the separator 13, reducing the risk of short circuit; meanwhile, two adjacent first protruding portions P2 can limit the separator 13 between them, thereby increasing resistance to inwardly contracting of the separator 13, reducing contracting degree of the separator 13, avoiding the active material layer 112 being exposed, and reducing the risk of short circuit. In addition, by increasing the width of the first protruding portion P2, it further can increase strength and overcurrent capability of the first protruding portion P2 of the first electrode member 11.

In order to reduce a space occupied by the electrode assembly 1 in the height direction Z and improve energy density, the second protruding portion P3 of the present disclosure is bent into two parts. Specifically, referring to FIG. 7, the second protruding portion P3 comprises a first connecting region P31 and a second connecting region P32, the first connecting region P31 is fixed with the first electrode terminal 32 by laser welding, the second connecting region P32 bends relative to the first connecting region P31 and connects the first protruding portion P2 and the first connecting region P31; the first connecting region P31 extends from an end of the second connecting region P32 close to the cap plate 31, and an extending direction of the first connecting region P31 is substantially consistent with the thickness direction Y of the electrode assembly 1. The second protruding portion P3 is provided as multiple in number, so the first connecting regions P31 are laminated together and welded with the connecting piece 4, and the second connecting regions P32 are independent of each other and not welded together. Similarly, the first protruding portions P2 are independent of each other too, a gap is formed between two adjacent first protruding portions P2, the electrolyte can flow into the inside of the electrode assembly 1 via the gap.

Figure 8:
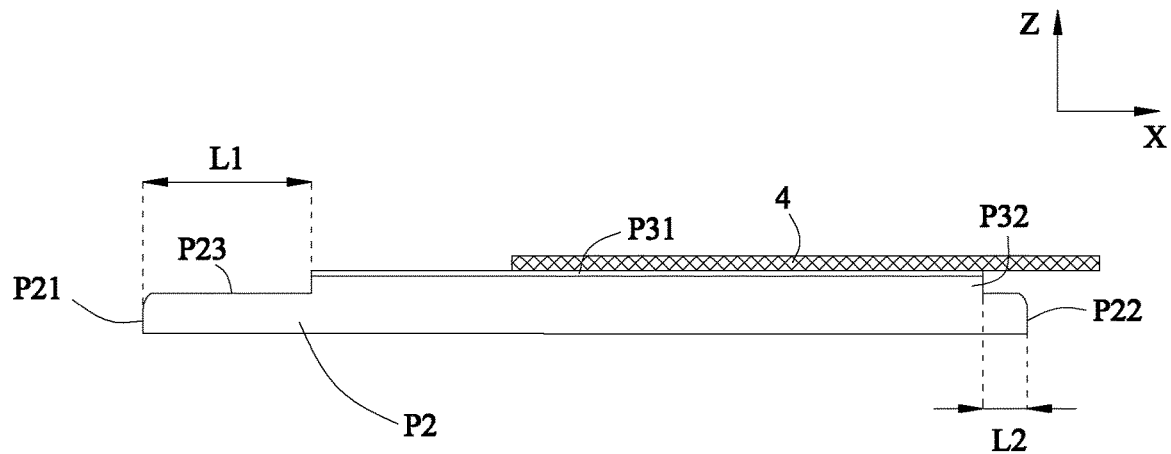
FIG. 8 is a schematic view of the first protruding portion and the second protruding portion before injecting an electrolyte according to the present disclosure.

In order to improve the overcurrent capability of the second protruding portion P3, it generally increases a dimension of the second protruding portion P3 in the width direction X, therefore, referring to FIG. 2, the first connecting region P31 of the second protruding portion P3 will extend to the lower side of the electrolyte injection hole 311. Referring to FIG. 8, a part of the first connecting region P31 is welded with the connecting piece 4, and another part of the first connecting region P31 extending to the lower side of the electrolyte injection hole 311 at least covers a part of the electrolyte injection hole 311.

Figure 9:
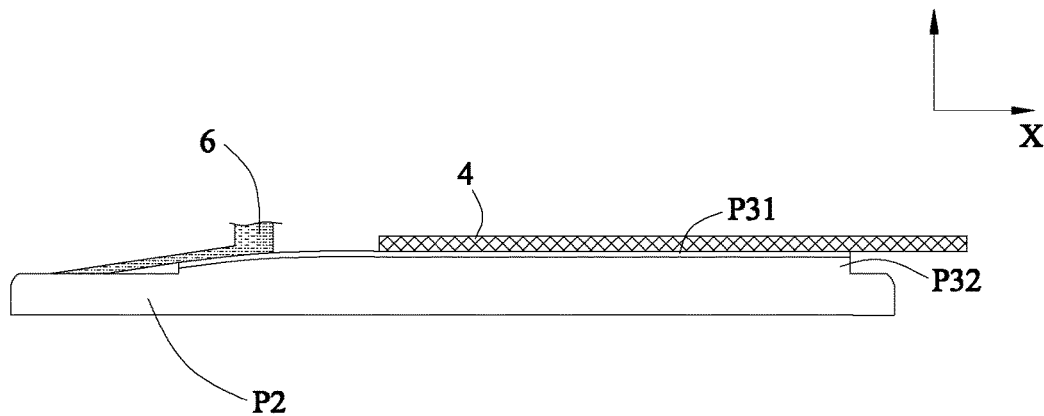
FIG. 9 is a schematic view of the first protruding portion and the second protruding portion in the process of injecting the electrolyte according to the present disclosure.

Referring to FIG. 9, when injecting electrolyte, the electrolyte 6 impacts the first connecting region P31, the first connecting region P31 can resist the electrolyte; under the impact of the electrolyte, an end of the first connecting region P31 away from the connecting piece 4 is bent downwardly, and the electrolyte flows along the bent first connecting region P31; the first connecting region P31 can decrease the flow rate of the electrolyte, change the flow direction of the electrolyte, thereby reducing the impact of the electrolyte on the separator 13. Certainly, if the first end P21 of the first protruding portion P2 close to the electrolyte injection hole 311 is flush with the second protruding portion P3, the electrolyte will still impact the separator 13 after the flow direction changed. In the present disclosure, the first end P21 of the first protruding portion P2 close to electrolyte injection hole 311 is beyond the second protruding portion P3, so the electrolyte flowing along the first connecting region P31 will impact the first protruding portion P2, and the first protruding portion P2 can bear the impact of the electrolyte, thereby decreasing the folding probability of the separator 13, and reducing the risk of short circuit.

Referring to FIG. 7, the first connecting region P31 is generally a flat plate shape, and perpendicular to the injection direction of the electrolyte; when the first connecting region P31 is subjected to the impact of the electrolyte, it bears a great impact and is prone to deform; at the same time, the electrolyte only can spread around along the first connecting region P31 and can not flow in to the main portion P1 directly. Preferably, the first protruding portion P2 extends from an end of the main portion P1 along a direction approaching the cap plate 31, an angle between the direction of the extending of the first protruding portion P2 and the injection direction of the electrolyte is less than 90 degrees, and a third end P23 of the first protruding portion P2 away from the main portion P1 faces the cap plate 31. Because the angle between the direction of the extending of the first protruding portion P2 and the injection direction of the electrolyte is less than 90 degrees (the directions of the extending of some first protruding portions P2 also may be parallel to the injection direction of the electrolyte), so the third end P23 of the first protruding portion P2 can split the electrolyte, thereby reducing the impact of the electrolyte on the third end P23, and decreasing deformation of the third end P23; moreover, the electrolyte can flow into the main portion P1 from between the first protruding portions P2, which can improve infiltration efficiency of the main portion P1. The third end P23 is connected with the second protruding portion P3, so when the electrolyte impacts the third end P23, the third end P23 is not prone to be folded inwardly.

The third end P23 of the first protruding portion P2 is not beyond the separator 13, in other words, along a direction approaching the cap plate 31, the separator 13 is beyond the third end P23. Two adjacent first protruding portions P2 are separated by the separator 13. When injecting the electrolyte, the electrolyte will firstly impact the separator 13, and the separator 13 may fold and contract inwardly, thereby exposing the third end P23 of the first protruding portion P2; the exposed third end P23 bears the impact of the electrolyte, so the separator 13 will not further contract inwardly, the separator 13 will be kept between the adjacent first protruding portions P2, and will never expose the active material layer 112, thereby reducing the risk of short circuit. In addition, along the direction approaching the cap plate 31, the third end P23 of the first protruding portion P2 is beyond the second electrode member 12, so even if the third end P23 is exposed, the third end P23 will not contact the second electrode member 12.

A stiffness of the first protruding portion P2 is greater than the stiffness of the separator 13. The stiffness of the separator 13 is smaller, so the separator 13 will be folded when the separator 13 is subjected to the impact of the electrolyte; the first protruding portion P2 is made of metal and has a greater stiffness, so the first protruding portion P2 can bear a larger impact. A part of the separator 13 beyond the third end P23 may be folded onto the third end P23, and because the first protruding portion P2 has the greater stiffness, the first protruding portion P2 can effectively support the separator 13, and decrease the contraction of separator 13.

In the width direction X, a second end P22 of the first protruding portion P2 away from the electrolyte injection hole 311 is beyond the second protruding portion P3. In other words, the first end P21 and the second end P22 of the first protruding portion P2 in the width direction X of the electrode assembly 1 are beyond the second protruding portion P3, which can further increase the width of the first protruding portion P2 and improve the overcurrent capability. Moreover, when injecting the electrolyte, a part of the electrolyte flows along the first connecting region P31 in a direction approaching the second end P22, the part of the second end P22 of the first protruding portion P2 beyond the second protruding portion P3 can effectively resist the electrolyte, thereby decreasing the folding probability of the separator 13.

In the width direction X, a length of the first end P21 beyond the second protruding portion P3 is L1, a length of the second end P22 beyond the second protruding portion P3 is L2, L1 is greater than L2. Referring to FIG. 9, when injecting the electrolyte, most of the electrolyte flows in a direction approaching the first end P21 because of resistance of other mechanical components, and the first end P21 is close to the injecting electrolyte hole 311, so the part of the first end P21 beyond the second protruding portion P3 needs to bear a larger impact; and only a small amount of the electrolyte flows in a direction approaching the second end P22, so the part of the second end P22 beyond the second protruding portion P3 needs to bear a smaller impact; therefore, L1 generally needs to be greater than L2. In addition, referring to FIG. 2, in the width direction X, a distance between the second protruding portion P3 and the case 2 is limited, so the value of L2 is small.

The first protruding portion P2 can further extend to a lower side of a vent 5. Referring to FIG. 7, the first protruding portion P2 is provided as multiple in number and the first protruding portions P2 are arranged to space apart from each other, so gas generated in the electrode assembly 1 can be exhausted via the gap between the first protruding portions P2. When short circuit of the secondary battery occurs, the gas generated in the electrode assembly 1 can be directly exhausted via the gap between the first protruding portions P2 and break the vent 5 to spout outwardly in time, thereby avoiding explosion of the secondary battery.

Figure 10:
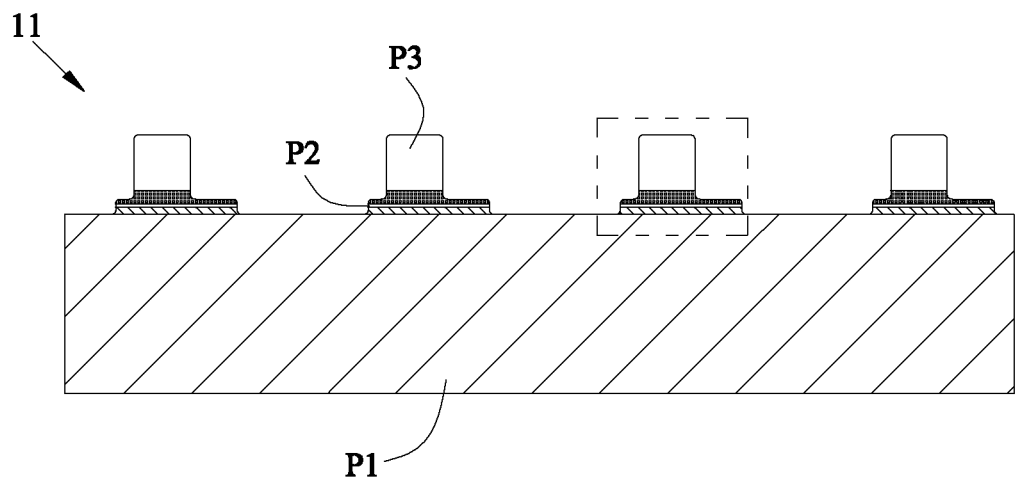
FIG. 10 is a schematic view of another embodiment of the first electrode member according to the present disclosure.
Figure 11:
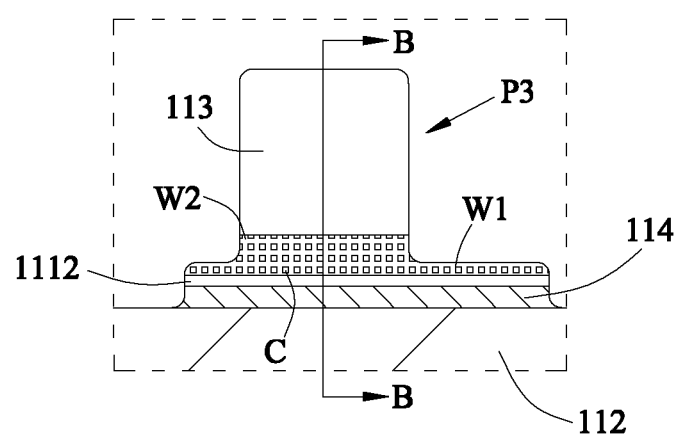
FIG. 11 is an enlarged view of a part of FIG. 10 within a dotted-line frame.
Figure 12:
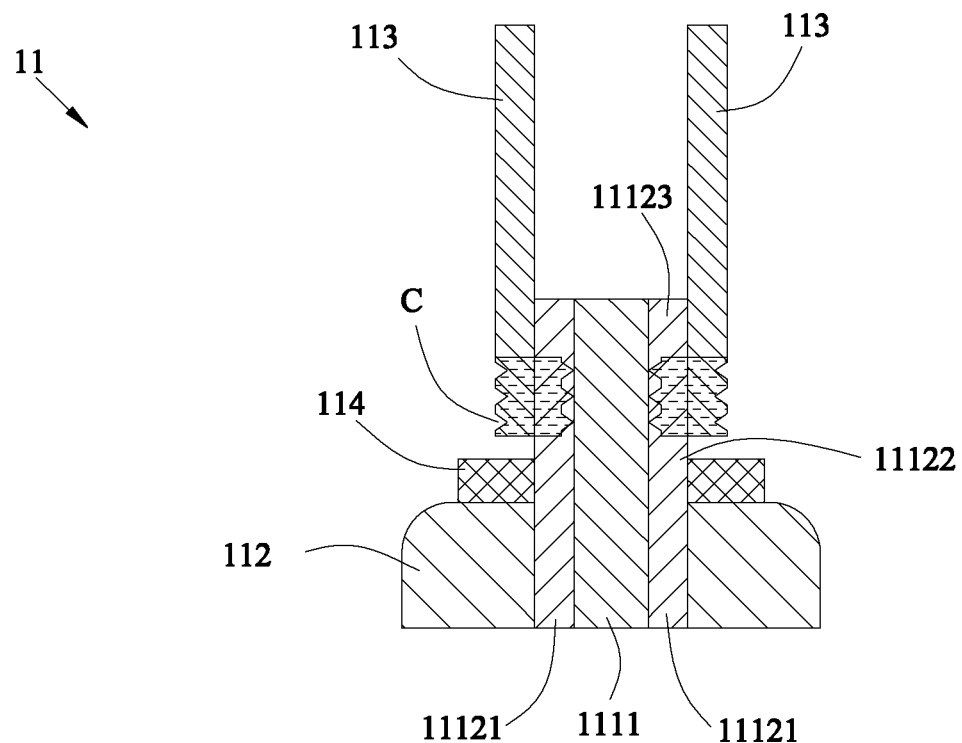
FIG. 12 is a cross sectional view taken along a line B-B of FIG. 11.
Figure 13:
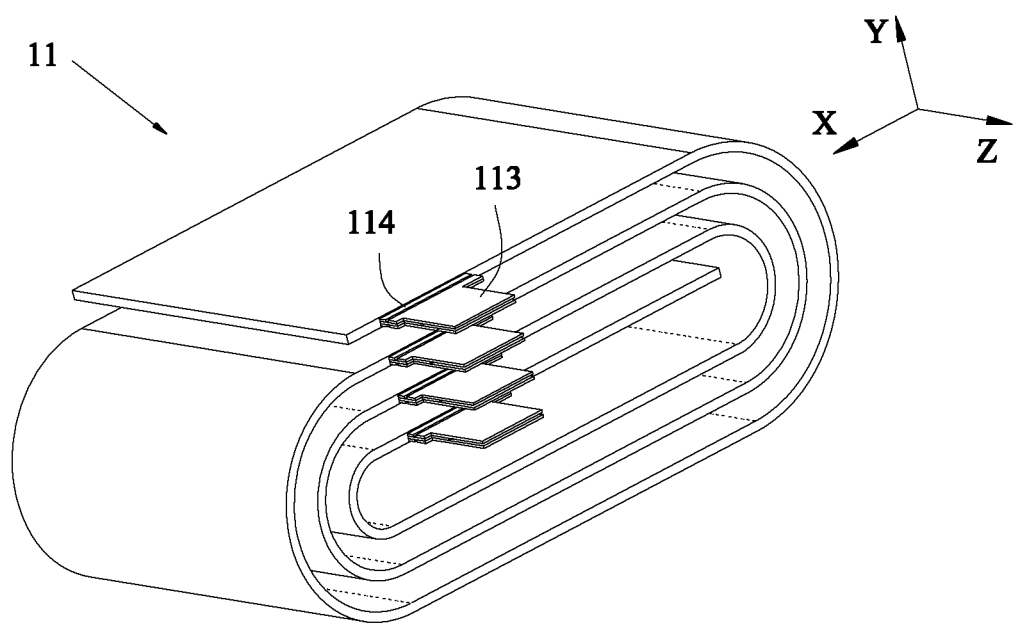
FIG. 13 is a schematic view of the first electrode member of FIG. 10 after winding.
Figure 14:
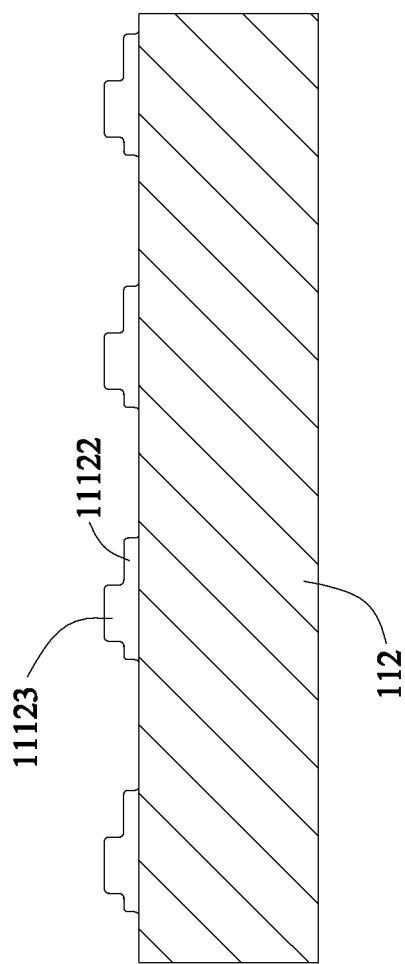
FIG. 14 is a schematic view of a current collector and an active material layer of the first electrode member of FIG. 10.

FIG. 10 is a schematic view of a second embodiment of the first electrode member 11 in a spread state, FIG. 11 is an enlarged view of a part of FIG. 10 within a dotted line frame, FIG. 12 is a cross sectional view taken along a line B-B of FIG. 11, FIG. 13 is a schematic view of the first electrode member of FIG. 10 after winding, FIG. 14 is a schematic view of a current collector and an active material layer of the first electrode member of FIG. 10.

Referring to FIG. 10 to FIG. 12, the first electrode member 11 of the second embodiment of the present disclosure comprises a current collector 111, an active material layer 112 and a conductive structure 113, the current collector 111 is a multi-layer structure and comprises an insulating substrate 1111 and a conducting layer 1112 provided on a surface of the insulating substrate 1111. The conducting layer 1112 and the conductive structure 113 can be metal foil.

The conducting layer 1112 comprises a first portion 11121 and a second portion 11122 extending from the first portion 11121, a surface of the first portion 11121 away from the insulating substrate 1111 is covered by the active material layer 112, and a surface of the second portion 11122 away from the insulating substrate 1111 is not covered by the active material layer 112.

The conductive structure 113 is welded with the second portion 11122 to form a first welding region W1, and the conductive structure 113 extends in a direction away from the first portion 11121. The conductive structure 113 can be fixed with the connecting piece 4 by welding. Referring to FIG. 13, after winding, the conductive structures 113 of the first electrode member 11 correspond to each other in the thickness direction Y.

The active material layer 112, the first portion 11121 and a region of the insulating substrate 1111 covered by the first portion 11121 form the main portion P1; the second portion 11122, a region of the insulating substrate 1111 covered by the second portion 11122 and a region of the conductive structure 113 overlapped with the second portion 11122 form the first protruding portion P2; a region of the conductive structure 113 beyond the second portion 11122 forms the second protruding portion P3. After winding, the second protruding portions P3 of the first electrode member 11 stack in the thickness direction Y, the first protruding portions P2 stack in the thickness direction Y.

The first protruding portion P2 is connected with the end of the main portion P1 close to the cap plate 31, the second protruding portion P3 connects the first protruding portion P2 and the connecting piece 4. In the width direction X, the first protruding portion P2 extends to the lower side of the electrolyte injection hole 311, and the first end P21 of the first protruding portion P2 close to the electrolyte injection hole 311 is beyond the second protruding portion P3.

In the secondary battery of the present disclosure, the electrolyte injection hole 311 faces the first protruding portion P2; when injecting the electrolyte, the electrolyte will impact the first protruding portion P2; the first protruding portion P2 can bear the impact of the electrolyte, thereby decreasing the folding probability of the separator 13, reducing the risk of short circuit. The first welding region W1 is formed in the first protruding portion P2 and has a greater stiffness, so the first protruding portion P2 can bear a larger impact and is not prone to be folded.

Because the current collector 111 of the first electrode member 11 is provided with the insulating substrate 1111, a thickness of the conducting layer 1112 can be decreased; when foreign matter pierces the first electrode member 11, because the conducting layer 1112 has a small thickness, a burr generated in the part of the conducting layer 1112 pierced by the foreign matter is small, and is difficult to pierce the separator 13, thereby avoiding short circuit, improving safety performance.

In the present disclosure, the second portion 11122 has a larger width, and the electric current can directly flow into the conductive structure 113 via the first welding region W1, which can improve the overcurrent capability of the first electrode member 1.

The conductive structure 113 can be connected with the second portion 11122 by ultrasonic welding. Referring to FIG. 11 and FIG. 12, a surface of the first welding region W1 formed by welding has a plurality of recess portions C. The recess portions C can increase the friction coefficient of the surface of the first welding region W1, reduce the flow rate of the electrolyte, thereby decreasing the impact of the electrolyte on the separator 13.

The number of the recess portions C is 0.4-0.9 in per square millimeter with respect to distribution density. If the density is excessively low, the connecting strength between the conductive structure 113 and the second portion 11122 will be insufficient, and the friction coefficient of the surface of the first welding region W1 will be insufficient too; if the density is excessively high, the conductive structure 113 and second portion 11122 are prone to be damaged.

The depth of the recess portion C is 8 μm-16 μm. If the depth is excessively small, the connecting strength between the conductive structure 113 and the second portion 11122 will be insufficient; if the depth is excessively large, the first welding region W1 may extend to the insulating substrate 1111, which results in the insulating substrate 1111 being damaged. At the same time, the depth of the recess portion C further can influence the friction coefficient of the surface of the first welding region W1.

A gap is provided between the first welding region W1 and the first portion 11121, and an insulating layer 114 is provided in the gap. A hardness of the insulating layer 114 is larger than a hardness of the conducting layer 1112, so the insulating layer 114 can provide supporting force for the second portion 11122, limit deformation of the second portion 11122, thereby preventing the conducting layer 1112 fracturing, improving the overcurrent capability of the first electrode member 11. The insulating layer 114 further can improve the anti-impact capability of the first protruding portion P2, and avoid the first protruding portion P2 being folded under the impact of the electrolyte.

Referring to FIG. 14, the conducting layer 1112 further comprises a third portion 11123, the third portion 11123 is connected with an end of the second portion 11122 away from the first portion 11121, and a surface of the third portion 11123 away from the insulating substrate 1111 is not covered by the active material layer 112. In the width direction X, a width of the third portion 11123 is smaller than a width of the second portion 11122. The conductive structure 113 is welded with the third portion 11123 to form a second welding region W2, the second welding region W2 is connected with the first welding region W1. The third portion 11123 can increase the connecting strength between the conducting layer 1112 and the conductive structure 113, and the electric current can directly flow into the second welding region W2 from the first welding region W1, which can improve the overcurrent capability between the conductive structure 113 and the conducting layer 1112.

What is claimed is:

1. A secondary battery, comprising an electrode assembly, a case and a cap assembly;
    the electrode assembly comprising a first electrode member, a second electrode member and a separator, the separator being provided between the first electrode member and the second electrode member;
    the case having an opening and receiving the electrode assembly;
    the cap assembly comprising a cap plate and a first electrode terminal provided to the cap plate, the cap plate covering the opening of the case;
    the cap plate having an electrolyte injection hole;
    the first electrode member comprising a main portion, a first protruding portion and a second protruding portion, the first protruding portion being connected with an end of the main portion under the cap plate, the second protruding portion electrically connecting the first protruding portion and the first electrode terminal;
    in a width direction, the first protruding portion extending to a lower side of the electrolyte injection hole, the first protruding portion having a first end and a second end, the first end and the second end being positioned at opposite sides of the electrolyte injection hole in the width direction, the first end being closer to the electrolyte injection hole than the second end, the first end being beyond the second protruding portion; and
    wherein the second protruding portion comprises a first connecting region and a second connecting region, the first connecting region is electrically connected with the first electrode terminal and extends to the lower side of the electrolyte injection hole, the second connecting region bends relative to the first connecting region and connects the first protruding portion and the first connecting region.

2. The secondary battery according to claim 1, wherein in the width direction, the second end of the first protruding portion is beyond the second protruding portion.

3. The secondary battery according to claim 2, wherein in the width direction, a length of the first end beyond the second protruding portion is L1, a length of the second end beyond the second protruding portion is L2, L1 is greater than L2.

4. The secondary battery according to claim 1, wherein
the first protruding portion extends from the end of the main portion along a direction approaching the cap plate;
a third end of the first protruding portion away from the main portion faces the cap plate and is connected with the second protruding portion.

5. The secondary battery according to claim 4, wherein
the third end of the first protruding portion is not beyond the separator;
a stiffness of the first protruding portion is greater than a stiffness of the separator.

6. A secondary battery comprising an electrode assembly, a case and a cap assembly;
the electrode assembly comprising a first electrode member, a second electrode member and a separator, the separator being provided between the first electrode member and the second electrode member;
the case having an opening and receiving the electrode assembly;
the cap assembly comprising a cap plate and a first electrode terminal provided to the cap plate, the cap plate covering the opening of the case;
the cap plate having an electrolyte injection hole;
the first electrode member comprising a main portion, a first protruding portion and a second protruding portion, the first protruding portion being connected with an end of the main portion under the cap plate, the second protruding portion electrically connecting the first protruding portion and the first electrode terminal;
in a width direction, the first protruding portion extending to a lower side of the electrolyte injection hole, the first protruding portion having a first end and a second end, the first end and the second end being positioned at opposite sides of the electrolyte injection hole in the width direction, the first end being closer to the electrolyte injection hole than the second end, the first end being beyond the second protruding portion;
wherein
the first electrode member comprises a current collector, an active material layer and a conductive structure, the current collector is a multi-layer structure and comprises an insulating substrate and a conducting layer provided on a surface of the insulating substrate;
the conducting layer comprises a first portion and a second portion extending from the first portion, a surface of the first portion away from the insulating substrate is covered by the active material layer, and a surface of the second portion away from the insulating substrate is not covered by the active material layer;
the conductive structure is welded with the second portion to form a first welding region, and the conductive structure extends in a direction away from the first portion;
the main portion comprises the active material layer, the first portion and a region of the insulating substrate covered by the first portion; the first protruding portion comprises the second portion, a region of the insulating substrate covered by the second portion and a region of the conductive structure overlapped with the second portion; the second protruding portion comprises a region of the conductive structure beyond the second portion;
and wherein
the conducting layer further comprises a third portion, the third portion is connected with an end of the second portion away from the first portion, and a surface of the third portion away from the insulating substrate is not covered by the active material layer;
in the width direction, a width of the third portion is smaller than a width of the second portion;
the conductive structure is welded with the third portion to form a second welding region, the second welding region is connected with the first welding region.

7. The secondary battery according to claim 6, wherein
a surface of the first welding region has a plurality of recess portions.

8. The secondary battery according to claim 7, wherein
the number of the recess portions is 0.4-0.9 in per square millimeter with respect to distribution density, and a depth of the recess portion is 8 µm-16 µm.

9. The secondary battery according to claim 6, wherein
a gap is provided between the first welding region and the first portion, and an insulating layer is provided in the gap.

10. The secondary battery according to claim 4, wherein
the first electrode member comprises a current collector, an active material layer and a conductive structure, the current collector is a multi-layer structure and comprises an insulating substrate and a conducting layer provided on a surface of the insulating substrate;
the conducting layer comprises a first portion and a second portion extending from the first portion, a surface of the first portion away from the insulating substrate is covered by the active material layer, and a surface of the second portion away from the insulating substrate is not covered by the active material layer;
the conductive structure is welded with the second portion to form a first welding region, and the conductive structure extends in a direction away from the first portion;
the main portion comprises the active material layer, the first portion and a region of the insulating substrate covered by the first portion; the first protruding portion comprises the second portion, a region of the insulating substrate covered by the second portion and a region of the conductive structure overlapped with the second portion; the second protruding portion comprises a region of the conductive structure beyond the second portion.

11. The secondary battery according to claim 10, wherein
a surface of the first welding region has a plurality of recess portions.

12. The secondary battery according to claim 11, wherein
the number of the recess portions is 0.4-0.9 in per square millimeter with respect to distribution density, and a depth of the recess portion is 8 µm-16 µm.

13. The secondary battery according to claim 10, wherein
a gap is provided between the first welding region and the first portion, and an insulating layer is provided in the gap.

14. A secondary battery, comprising an electrode assembly, a case and a cap assembly;
the electrode assembly comprising a first electrode member, a second electrode member and a separator, the separator being provided between the first electrode member and the second electrode member;
the case having an opening and receiving the electrode assembly;
the cap assembly comprising a cap plate and a first electrode terminal provided to the cap plate, the cap plate covering the opening of the case;
the cap plate having an electrolyte injection hole;

the first electrode member comprising a main portion, a first protruding portion and a second protruding portion, the first protruding portion being connected with an end of the main portion under the cap plate, the second protruding portion electrically connecting the first protruding portion and the first electrode terminal;

in a width direction, the first protruding portion extending to a lower side of the electrolyte injection hole, the first protruding portion having a first end and a second end, the first end and the second end being positioned at opposite sides of the electrolyte injection hole in the width direction, the first end being closer to the electrolyte injection hole than the second end, the first end being beyond the second protruding portion;

wherein the first protruding portion extends from the end of the main portion along a direction approaching the cap plate;

a third end of the first protruding portion away from the main portion faces the cap plate and is connected with the second protruding portion;

the first electrode member comprises a current collector, an active material layer and a conductive structure, the current collector is a multi-layer structure and comprises an insulating substrate and a conducting layer provided on a surface of the insulating substrate;

the conducting layer comprises a first portion and a second portion extending from the first portion, a surface of the first portion away from the insulating substrate is covered by the active material layer, and a surface of the second portion away from the insulating substrate is not covered by the active material layer;

the conductive structure is welded with the second portion to form a first welding region, and the conductive structure extends in a direction away from the first portion;

the main portion comprises the active material layer, the first portion and a region of the insulating substrate covered by the first portion; the first protruding portion comprises the second portion, a region of the insulating substrate covered by the second portion and a region of the conductive structure overlapped with the second portion; the second protruding portion comprises a region of the conductive structure beyond the second portion;

and wherein the conducting layer further comprises a third portion, the third portion is connected with an end of the second portion away from the first portion, and a surface of the third portion away from the insulating substrate is not covered by the active material layer;

in the width direction, a width of the third portion is smaller than a width of the second portion;

the conductive structure is welded with the third portion to form a second welding region, the second welding region is connected with the first welding region.

15. The secondary battery according to claim 5, wherein the first electrode member comprises a current collector, an active material layer and a conductive structure, the current collector is a multi-layer structure and comprises an insulating substrate and a conducting layer provided on a surface of the insulating substrate;

the conducting layer comprises a first portion and a second portion extending from the first portion, a surface of the first portion away from the insulating substrate is covered by the active material layer, and a surface of the second portion away from the insulating substrate is not covered by the active material layer;

the conductive structure is welded with the second portion to form a first welding region, and the conductive structure extends in a direction away from the first portion;

the main portion comprises the active material layer, the first portion and a region of the insulating substrate covered by the first portion; the first protruding portion comprises the second portion, a region of the insulating substrate covered by the second portion and a region of the conductive structure overlapped with the second portion; the second protruding portion comprises a region of the conductive structure beyond the second portion.

16. The secondary battery according to claim 15, wherein a surface of the first welding region has a plurality of recess portions.

17. The secondary battery according to claim 16, wherein the number of the recess portions is 0.4-0.9 in per square millimeter with respect to distribution density, and a depth of the recess portion is 8 μm-16 μm.

18. The secondary battery according to claim 15, wherein a gap is provided between the first welding region and the first portion, and an insulating layer is provided in the gap.

* * * * *